T. G. & J. C. Wilson.
Harvester Dropper.
№ 17123. Patented Apr. 21, 1857.

UNITED STATES PATENT OFFICE.

J. C. WILSON AND T. G. WILSON, OF CEDAR HILL, TEXAS.

IMPROVEMENT IN HARVESTERS.

Specification forming part of Letters Patent No. 17,123, dated April 21, 1857.

*To all whom it may concern:*

Be it known that we, J. C. WILSON and T. G. WILSON, of Cedar Hill, in the county of Dallas and State of Texas, have invented a new and useful Improvement in Harvesters; and we do hereby declare that the following is a full, clear, and exact description of the construction and operation of the same, reference being had to the annexed drawings, forming part of this specification, in which—

Figure 1:
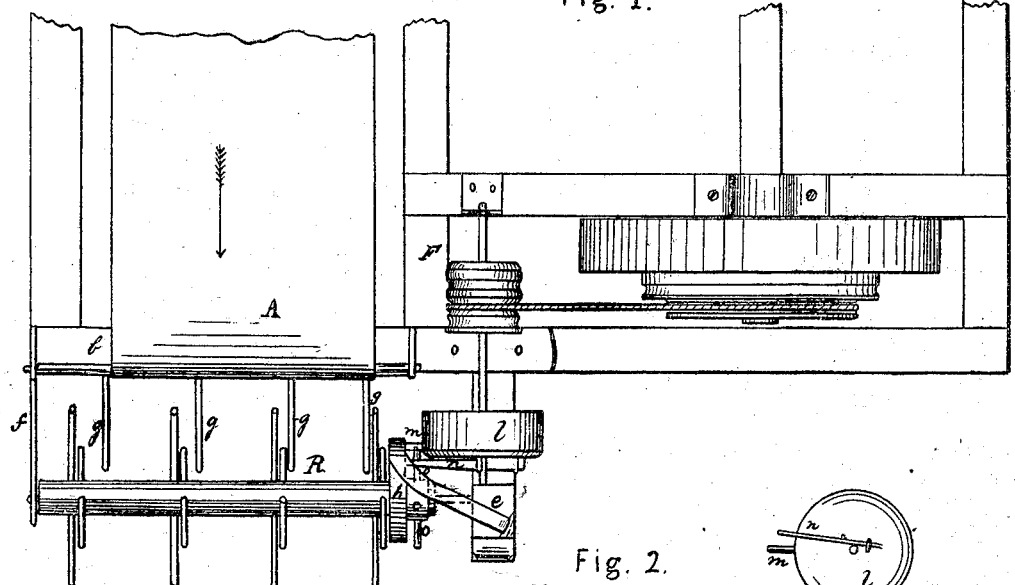
Figure 2:
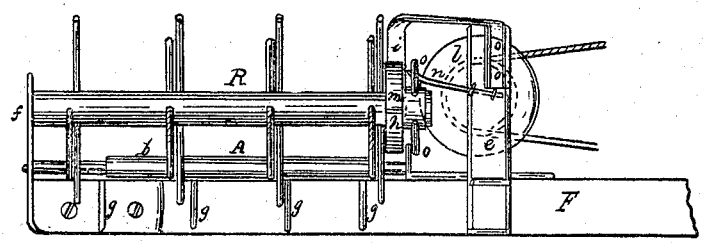
Figure 3:
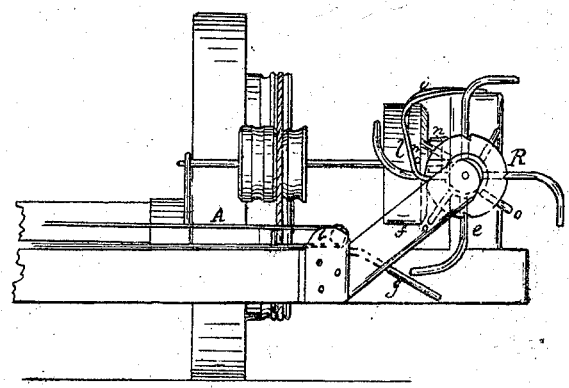

Figure 1 is a plan of the portion of harvester to which our improvement is attached. Fig. 2 is a side elevation. Fig. 3 is a front elevation.

Similar characters of reference in the several figures denote the same parts.

The nature of our invention consists in the peculiar combination of devices, hereinafter to be described, to effect the rapid turning of an overhanging revolving reel for the delivering of the accumulated gavel, the grain being received upon an endless apron, and by it conveyed to an inclined grating, on which it remains until the turning of the reel permits its discharge, the said devices consisting of a spring-arm and rigid pin upon a pulley, and having such relation to each other that the spring-arm will encounter an arm of the reel-shaft, and by being forced back acquire sufficient force to produce the rapid turning of the reel, when the rigid pin forces the spring-detent from out the notch of the ratchet holding the reel-shaft in position, the details of construction and operation being as hereinafter set forth.

F is the frame of the machine, on the front of which is an endless apron, A, moved in direction of arrow. This apron constitutes the platform on which the cut grain is received.

R is a rake or reel with curved teeth, hung between standard $e$ and projecting stud $f$, so as to be entirely outside of the main frame F, from which runs an inclined grating composed of bars $g$, which will receive the grain carried over the side of the machine by the apron A.

Upon the reel-shaft is a ratchet, $h$, having four teeth, (though the number of teeth will depend on number of branches of the reel.) A spring-detent, $i$, by entering one of the ratchet-teeth, holds the reel in position, so that the teeth of one branch of the reel will prevent the grain from passing off the grating $g$ until the stud $m$ on wheel $l$, by pressing against the under side of the spring-detent, releases the ratchet and permits the spring-arm $n$ of the said wheel, which had previously encountered one of the arms $o$ of the reel-shaft, to turn the reel by the power thus gathered in the spring. The accumulated gavel is thus instantly deposited upon the ground, and another series of reel-teeth brought into position to hold the grain for the next gavel. The stud $m$, slipping from the spring-detent, allows it to enter the next notch of the ratchet, so as to hold the reel secure, as above described.

By this construction the cut grain is deposited in gavels at regular intervals along the track of the machine.

What we claim as new and of our own invention, and desire to secure by Letters Patent, is—

Operating the reel by means of the rigid pin $m$ and spring-arm $n$, attached to pulley $l$, in combination with ratchet $h$, arms $o$, and holding-spring $i$, when said parts are arranged to operate in relation to each other, as and for the purpose set forth.

In testimony whereof we have hereunto signed our names before two subscribing witnesses.

J. C. WILSON.
T. G. WILSON.

Witnesses:
GEO. PATTEN,
JOHN S. HOLLINGSHEAD.